United States Patent
Kim et al.

(10) Patent No.: US 11,237,428 B2
(45) Date of Patent: Feb. 1, 2022

(54) DISPLAY APPARATUS

(71) Applicant: SAMSUNG ELECTRONICS CO., LTD., Suwon-si (KR)

(72) Inventors: Daesik Kim, Suwon-si (KR); Farid Mukhtarov, Suwon-si (KR); Yasuhiro Nishida, Suwon-si (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/906,117

(22) Filed: Jun. 19, 2020

(65) Prior Publication Data

US 2021/0026201 A1  Jan. 28, 2021

(30) Foreign Application Priority Data

Jul. 22, 2019 (KR) .................. 10-2019-0088277

(51) Int. Cl.
*F21V 7/00* (2006.01)
*G02F 1/13357* (2006.01)
(Continued)

(52) U.S. Cl.
CPC .. *G02F 1/133605* (2013.01); *G02F 1/133603* (2013.01); *G02F 1/133621* (2013.01); *F21V 7/06* (2013.01); *G02F 1/133614* (2021.01)

(58) Field of Classification Search
CPC ......... G02F 1/133605; G02F 1/133603; G02F 1/133621; G02F 2001/133614;
(Continued)

(56) References Cited

U.S. PATENT DOCUMENTS

2007/0274667 A1   11/2007  Loh et al.
2013/0215600 A1*  8/2013  Lee .................. G02F 1/133603
                                                             362/97.1
(Continued)

FOREIGN PATENT DOCUMENTS

FR       2 642 209 A1     7/1990
JP       2008-216540 A    9/2008
(Continued)

OTHER PUBLICATIONS

Communication dated Nov. 16, 2020 issued by the European Intellectual Property Office in counterpart European Application No. 20180831.8.

(Continued)

*Primary Examiner* — Y M. Quach Lee
(74) *Attorney, Agent, or Firm* — Sughrue Mion, PLLC

(57) ABSTRACT

A display apparatus includes a liquid crystal panel; a light source module configured to provide light to the liquid crystal panel; a printed circuit board (PCB) on which the light source module is mounted; and at least one chassis accommodating the liquid crystal panel and the PCB. The light source module includes: a substrate; a reflector positioned on the substrate, and including a curved surface having a shape resulting from rotating a portion of a parabola around a directrix of the parabola, the directrix perpendicular to the substrate; and a plurality of light sources mounted on the substrate along focal points of the parabola of the reflector.

20 Claims, 11 Drawing Sheets

(51) Int. Cl.
*G02F 1/1335* (2006.01)
*F21V 7/06* (2006.01)

(58) Field of Classification Search
CPC ......... G02F 1/133602; G02F 1/133611; F21V 7/0083; F21V 7/04; F21V 7/06
See application file for complete search history.

(56) References Cited

U.S. PATENT DOCUMENTS

| | | | |
|---|---|---|---|
| 2013/0229801 A1* | 9/2013 | Breidenassel | F21K 9/68 362/235 |
| 2013/0271961 A1* | 10/2013 | Nakamura | G02F 1/133615 362/97.2 |
| 2013/0279197 A1* | 10/2013 | Holman | F21V 7/0083 362/613 |
| 2014/0179037 A1 | 6/2014 | Lai | |
| 2015/0146413 A1 | 5/2015 | Chang | |
| 2016/0053966 A1* | 2/2016 | Dassanayake | F21V 7/06 362/296.06 |
| 2016/0116139 A1* | 4/2016 | Zhao | F21V 7/0091 362/308 |
| 2016/0223158 A1 | 8/2016 | Park et al. | |

FOREIGN PATENT DOCUMENTS

| | | |
|---|---|---|
| KR | 10-2007-0003599 A | 1/2007 |
| KR | 10-2013-0061796 A | 6/2013 |
| KR | 10-2016-0068267 A | 6/2016 |
| KR | 10-2017-0073272 A | 6/2017 |
| WO | 2018/185475 A1 | 10/2018 |

OTHER PUBLICATIONS

International Search Report dated Nov. 27, 2020 issued by the International Searching Authority in counterpart International Application No. PCT/KR2020/008215 (PCT/ISA/210).

* cited by examiner

DISPLAY APPARATUS

CROSS-REFERENCE TO THE RELATED APPLICATION

This application is based on and claims priority under 35 U.S.C. § 119 to Korean Patent Application No. 10-2019-0088277, filed on Jul. 22, 2019 in the Korean Intellectual Property Office, the disclosure of which is incorporated by reference herein in its entirety.

BACKGROUND

1. Field

Embodiments of the disclosure relate to a display apparatus, and more particularly, to a display apparatus capable of performing local dimming.

2. Description of Related Art

A display apparatus is a kind of output apparatus that visually displays images and data information, such as characters, figures, etc. The display apparatus includes, for example, a television, various monitors, various portable terminals (for example, a notebook, a tablet PC, and a smart phone), etc.

The display apparatus is classified into a self-emissive type using a display panel such as Organic Light Emitting Diodes (OLEDs) which itself emits light, and a non-emissive type using a display panel such as a Liquid Crystal Display (LCD) which receives light from a backlight unit without itself emitting light.

The backlight unit is composed of light sources, such as Cold Cathode Fluorescent Lamps (CCFLs), External Electrode Fluorescent Lamps (EEFLs), and light emitting diodes (LEDs), and various optical members.

The backlight unit is classified into a direct type in which light sources are positioned behind a display panel, and an edge type in which light sources are positioned at sides of a display panel.

SUMMARY

Therefore, it is an aspect of the disclosure to provide a display apparatus with wide beam angle.

It is another aspect of the disclosure to provide a slim display apparatus.

It is another aspect of the disclosure to provide a display apparatus with high productivity.

It is another aspect of the disclosure to provide a display apparatus with high optical efficiency.

Additional aspects of the disclosure will be set forth in part in the description which follows and, in part, will be understood from the description, or may be learned by practice of embodiments of the disclosure.

In accordance with an aspect of the disclosure, a display apparatus includes a liquid crystal panel; a light source module configured to provide light to the liquid crystal panel; a printed circuit board (PCB) on which the light source module is mounted; and at least one chassis accommodating the liquid crystal panel and the PCB. The light source module includes: a substrate; a reflector positioned on the substrate, and including a curved surface having a shape resulting from rotating a portion of a parabola around a directrix of the parabola, the directrix perpendicular to the substrate; and a plurality of light sources mounted on the substrate along focal points of the parabola of the reflector.

The plurality of light sources may be arranged rotationally symmetrical with respect to the directrix of the parabola of the reflector.

The light source module may include a transmitting member that includes a transparent material, the transmitting member may be positioned between the plurality of light sources and the reflector.

The transparent material of the transmitting member may include silicon.

The light source module may further include a reflection member positioned on a surface of the reflector, which is opposite to the curved surface of the reflector on which the transmitting member is positioned, the reflection member may include a body having a greater refractive index than the transmitting member.

The body of the reflection member may include titanium dioxide $TiO_2$.

The plurality of light sources may be configured to irradiate the light, and the reflector may include at least one from among silver and aluminum, the reflector may be configured to reflect the light irradiated from the plurality of light sources.

The plurality of light sources may include blue light emitting diodes (LEDs), and the light source module further include a color conversion device including a phosphor, the color conversion device may be configured to convert blue light irradiated from the plurality of light sources into white light.

The color conversion device may be in a shape of a ring extending along an arrangement direction of the plurality of light sources.

The plurality of light sources may include blue light emitting diodes (LEDs), and a wavelength of one of the plurality of light sources is different from a wavelength of another of the plurality of light sources.

The plurality of light sources may be electrically connected to each other.

The light source module may further include a reflection pad positioned behind the substrate.

The plurality of light sources may be arranged in a shape of a polygon.

The plurality of light sources may be arranged in a shape of a circle.

According to an aspect of the disclosure, a display apparatus may include: a light source module configured to provide light; a printed circuit board (PCB) on which the light source module is mounted; and at least one chassis accommodating the PCB. The light source module may include: a substrate; a reflector positioned on the substrate, and including a curved surface having a shape resulting from rotating a portion of a parabola around a directrix of the parabola, the directrix perpendicular to the substrate; and a plurality of light sources arranged rotationally symmetrical to each other with respect to the directrix of the parabola of the reflector.

The plurality of light sources may be mounted on the substrate along focal points of the parabola of the reflector.

The plurality of light sources may be configured to irradiate the light, and the reflector may include at least one from among silver and aluminum, the reflector may be configured to reflect the light irradiated from the plurality of light sources.

The plurality of light sources may include blue light emitting diodes (LEDs), and the light source module may further include a color conversion device including a phosphor, the color conversion device may be configured to convert blue light irradiated from the plurality of light sources into white light.

The light source module may further include: a transmitting member including a transparent material, the transmitting member positioned between the reflector and the plurality of light sources; and a reflection member positioned on a surface of the reflector, which is opposite to the curved surface of the reflector on which the transmitting member is positioned, the reflection member may include a body having a greater refractive index than the transmitting member.

According to an aspect of the disclosure, a display apparatus may include: a light source module configured to provide light; a printed circuit board (PCB) on which the light source module is mounted; and at least one chassis accommodating the PCB. The light source module may include: a substrate; a reflector positioned on the substrate, and including a curved surface having a shape resulting from rotating a portion of a parabola around a directrix of the parabola, the directrix perpendicular to the substrate; a plurality of light sources mounted on the substrate along focal points of the parabola of the reflector, and arranged rotationally symmetrical with respect to the directrix of the parabola of the reflector; and a reflection pad positioned behind the substrate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
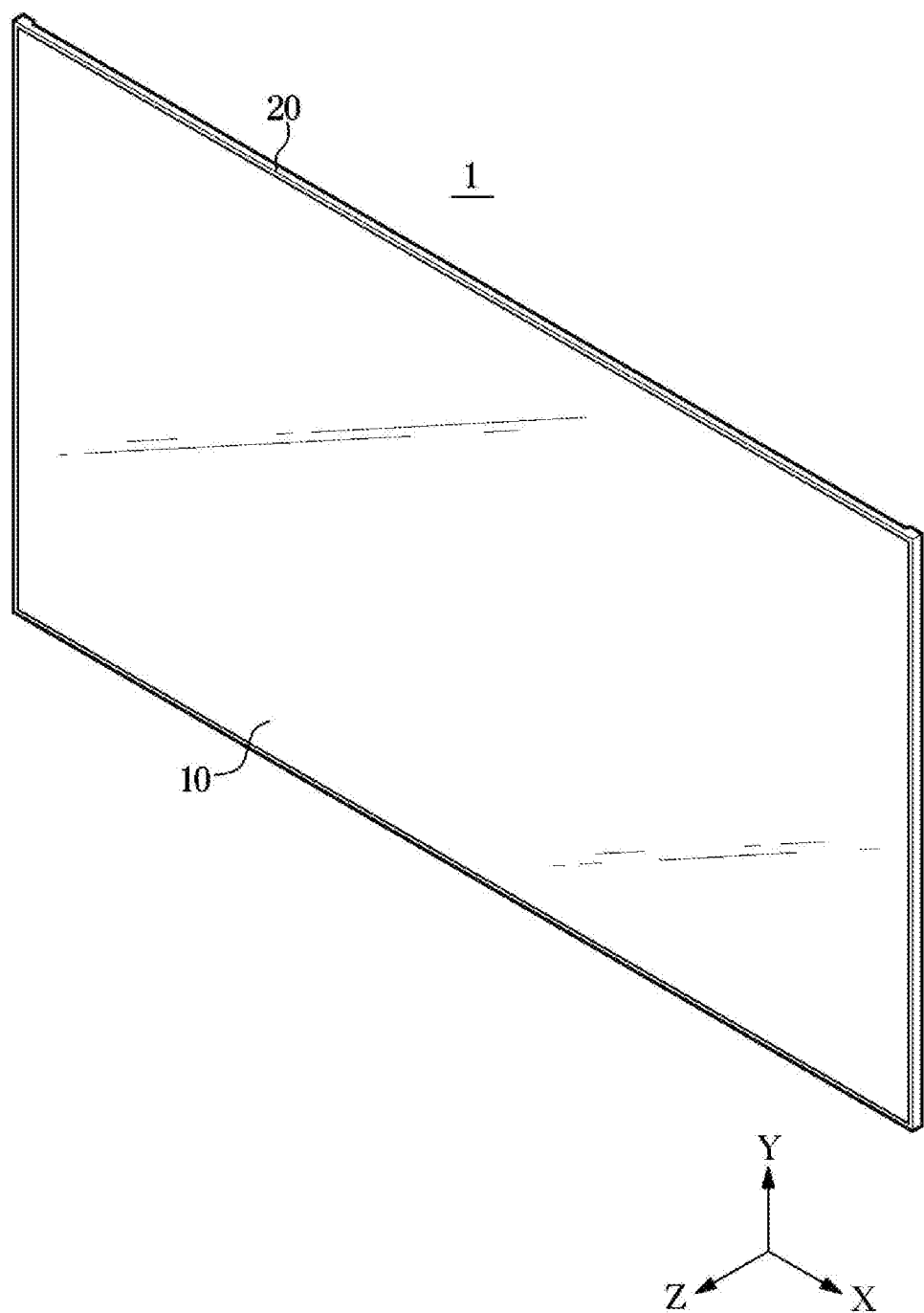
FIG. 1 shows an outer appearance of a display apparatus according to an embodiment of the disclosure.

The embodiments described in the present specification are only non-limiting example embodiments of the disclosure, and are not intended to represent all the technical ideas of the disclosure. Thus, it is to be understood that various equivalents or modified examples, which may replace the embodiments described in the present specification, are included in the scope of right of the disclosure when filing the present application.

It is to be understood that the singular forms "a," "an," and "the" include plural referents unless the context clearly dictates otherwise. In the drawings, for definite explanation, the shapes, sizes, etc. of components are more or less exaggeratedly shown.

In the present specification, it will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Directions "front", "rear", "upper", "lower", "left", and "right" will be referred to based on directions shown in FIG. 1 throughout the specification. In FIG. 1, X-axis, Y-axis, and Z-axis directions, which are perpendicular to each other, are shown, wherein the X-axis direction is a longer side (11) direction of a liquid crystal panel (10 of FIG. 1), the Y-axis direction is a shorter side (12) direction of the liquid crystal panel (10 of FIG. 1), and the Z-axis direction is a front-rear direction.

Throughout the disclosure, the expression "at least one of a, b, or c" indicates only a, only b, only c, both a and b, both a and c, both b and c, all of a, b, and c, or variations thereof.

Hereinafter, embodiments of the disclosure will be described in detail with reference to the accompanying drawings.

Figure 2:
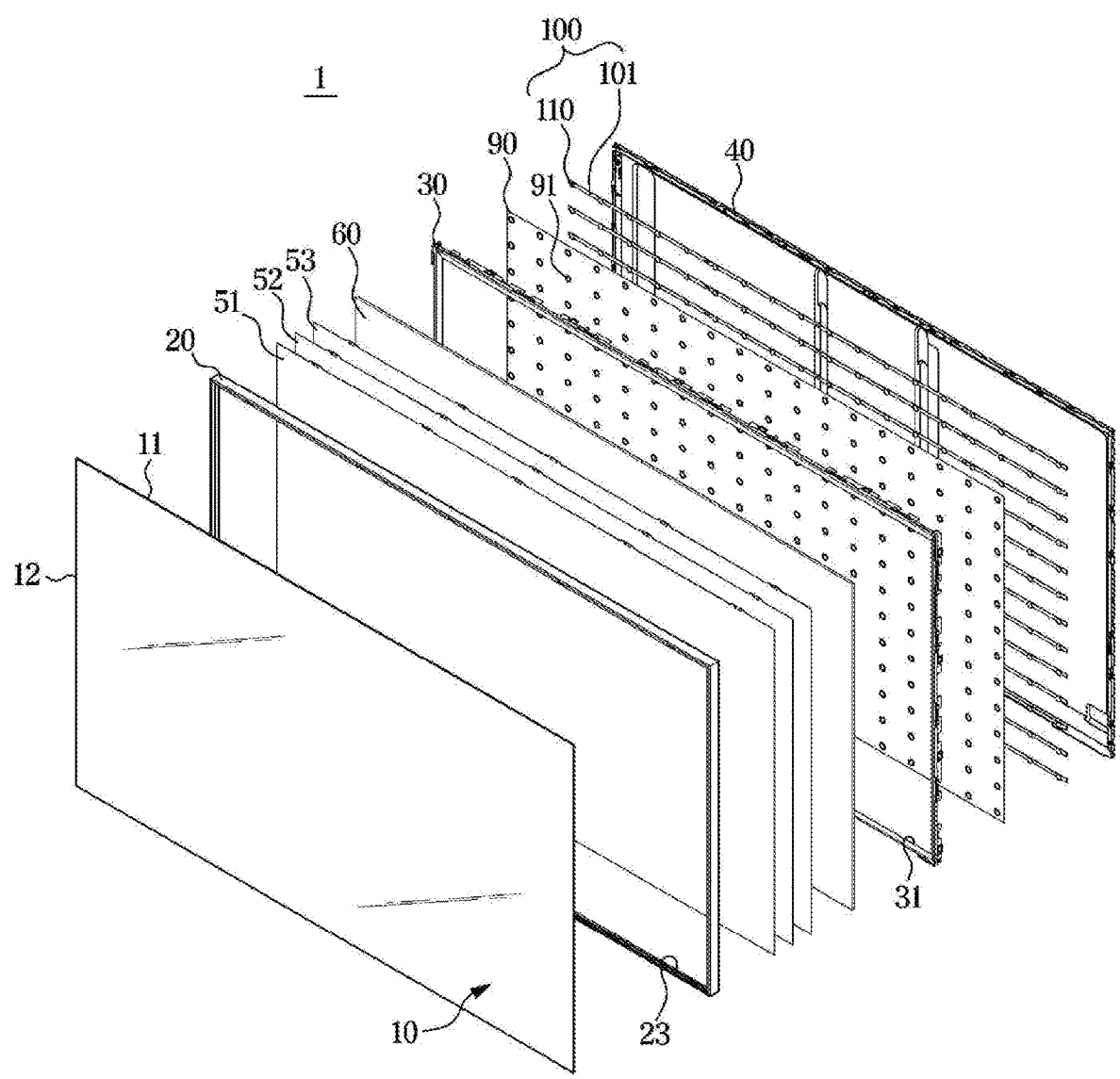
FIG. 2 is an exploded perspective view showing main components of the display apparatus shown in FIG. 1.

FIG. 1 shows an outer appearance of a display apparatus according to an embodiment of the disclosure. FIG. 2 is an exploded perspective view showing main components of the display apparatus shown in FIG. 1.

A display apparatus 1 according to an embodiment of the disclosure will be described with reference to FIGS. 1 and 2.

The display apparatus 1 may include a liquid crystal panel 10 for displaying images, a backlight unit positioned behind the liquid crystal panel 10 to provide light to the liquid crystal panel 10, and a chassis assembly for supporting the backlight unit and the liquid crystal panel 10.

The chassis assembly may include a rear chassis 40 for supporting the backlight unit, a front chassis 20 positioned in front of the rear chassis 40 to support the liquid crystal panel 10, and a middle mold 30 coupled between the front chassis 20 and the rear chassis 40. The chassis assembly may accommodate the liquid crystal panel 10.

The liquid crystal panel 10 may include a thin film transistor substrate on which thin film transistors are arranged in a matrix form, a color filter substrate coupled to the thin film transistor substrate in such a way to be parallel to the thin film transistor substrate, and a liquid crystal injected between the thin film transistor substrate and the color filter substrate to change its optical properties according to a change of a voltage or temperature.

The backlight unit may be positioned behind the liquid crystal panel 10 and irradiate light toward the liquid crystal panel 10. The backlight unit may include a light source device 100 including a light source module 110 and a printed circuit board (PCB) 101 on which the light source module 110 is mounted, and at least one optical member positioned on a moving path of light emitted from the light source module 110. A plurality of the light source device 100 may be provided in such a way to be spaced from each other.

On the PCB 101, a plurality of the light source module 110 may be mounted in a line. On the PCB 101, a driving power line, etc. may be formed to supply driving power to the plurality of the light source module 110, and the driving power line may be connected to a signal cable (not shown) and a backlight driving circuit (not shown). The PCB 101 may be accommodated in the chassis assembly.

The optical members may be positioned on the moving path of light emitted from the plurality of the light source module 110 to guide a traveling direction of the light, reflect the light, diffuse the light, or improve properties of the light.

The optical members may include a reflector sheet 90 for reflecting light to prevent loss, a diffuser plate 60 for uniformly diffusing irregular light exiting the plurality of the light source module 110, a quantum dot sheet 53 for changing a wavelength of light to improve color reproduction, and a plurality of optical sheets 51 and 52 for improving optical properties.

The reflector sheet 90 may reflect light emitted from the plurality of the light source module 110 or light traveling backward from the diffuser plate 60, toward the diffuser plate 60. The reflector sheet 90 may be positioned on the PCB 101. The reflector sheet 90 may be in close contact with the PCB 101. In the reflector sheet 90, a plurality of through holes 91 through which the plurality of the light source module 110 pass may be formed.

The diffuser plate 60 may uniformly diffuse irregular light generated from the plurality of the light source module 110, and support the quantum dot sheet 53 and the optical sheets 51 and 52. The diffuser plate 60 may uniformly diffuse light being incident to the incident surface of the diffuser plate 60 and transmit the light from the exit surface of the diffuser plate 60.

The quantum dot sheet 53 may be positioned in front of the diffuser plate 60 in such a way to be spaced from the diffuser plate 60. In an inside of the quantum dot sheet 53, a plurality of quantum dots that are semiconductor crystals having a size of several nanometers that generate light may be dispersed. The quantum dots may receive blue light and generate all colors of visible light according to their sizes. Quantum dots having a smaller size may generate light of a shorter wavelength, and quantum dots having a greater size may generate light of a longer wavelength.

The optical sheets 51 and 52 may be positioned in front of the diffuser plate 60 to improve optical properties of light exiting the diffuser plate 60. The optical sheets 51 and 52 may include a diffuser sheet for cancelling a pattern of the diffuser plate 60, a prism sheet for concentrating light to improve brightness, a protection sheet for protecting the other optical sheets from an external impact or entrance of foreign materials, and a dual brightness enhancement film DBEF for transmitting specific polarized light and reflecting the other polarized light to improve brightness.

The rear chassis 40 may be positioned behind the backlight unit. The rear chassis 40 may have a shape of a plate of which edges are bent frontward. The backlight unit may be accommodated between the rear chassis 40 and the front chassis 20.

The rear chassis 40 may radiate heat generated from heating devices such as the plurality of the light source module 110 to outside. The rear chassis 40 may be formed of various metal materials, such as aluminum and SUS, or a plastic material such as ABS.

The front chassis 20 may have a shape of a frame having an opening 23 such that light of the backlight unit is provided to the liquid crystal panel 10.

The middle mold 30 may support the diffuser plate 60 and reflect light emitted from the plurality of the light source device 100 to the diffuser plate 60. The middle mold 30 may maintain a space between the diffuser plate 60 and the plurality of the light source device 100. The middle mold 30 may be coupled between the front chassis 20 and the rear chassis 40.

The middle mold 30 may be formed in a shape of a frame having an opening 31 (see FIG. 2). In the opening 31, the plurality of the light source device 100 may be positioned. A material having high reflectivity may be coated on a surface of the middle mold 30. The material having high reflectivity may be coated on the entire surface or a portion of the middle mold 30. The entirety or a portion of the middle mold 30 may have a white color to efficiently reflect light.

Figure 3:
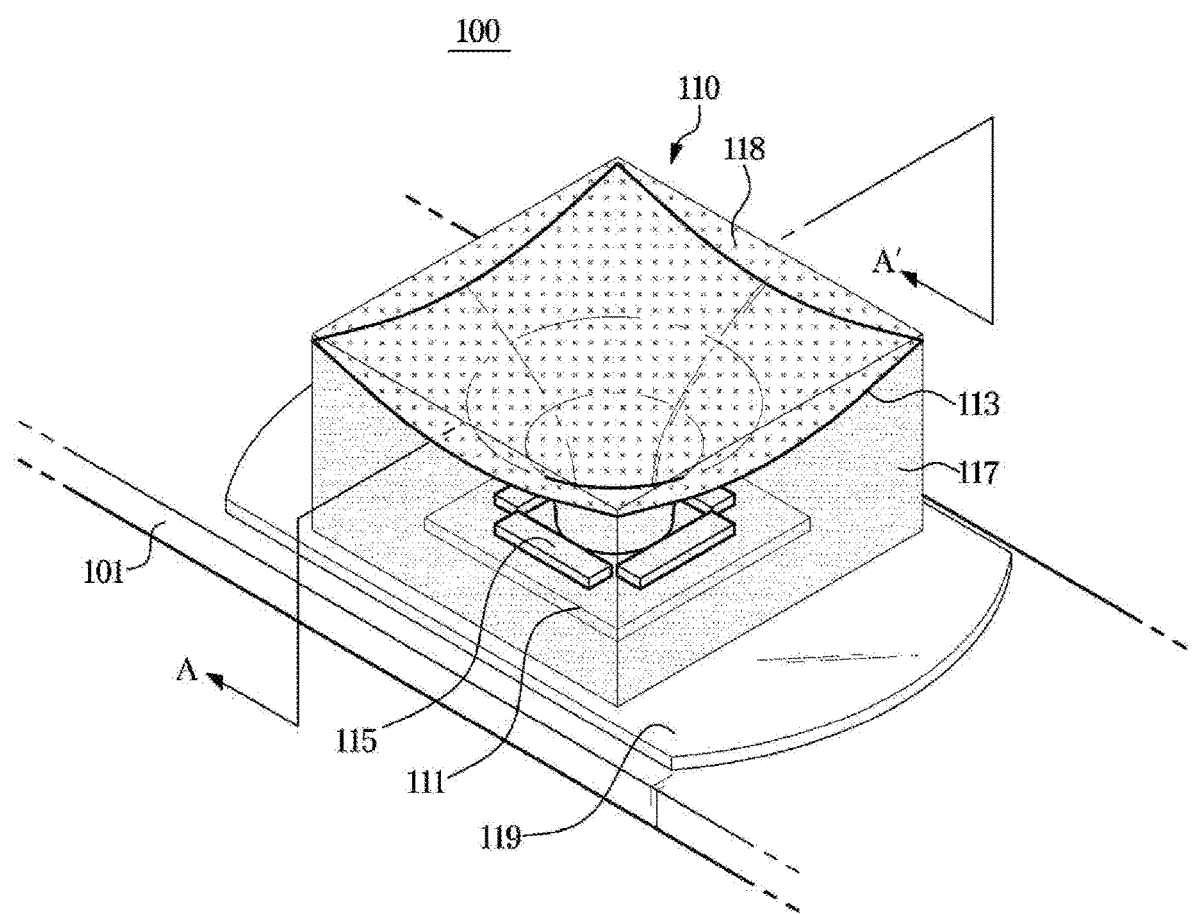
FIG. 3 is an enlarged schematic view showing a light source module shown in FIG. 2 and a portion of a printed circuit board (PCB) on which the light source module is mounted.
Figure 4:
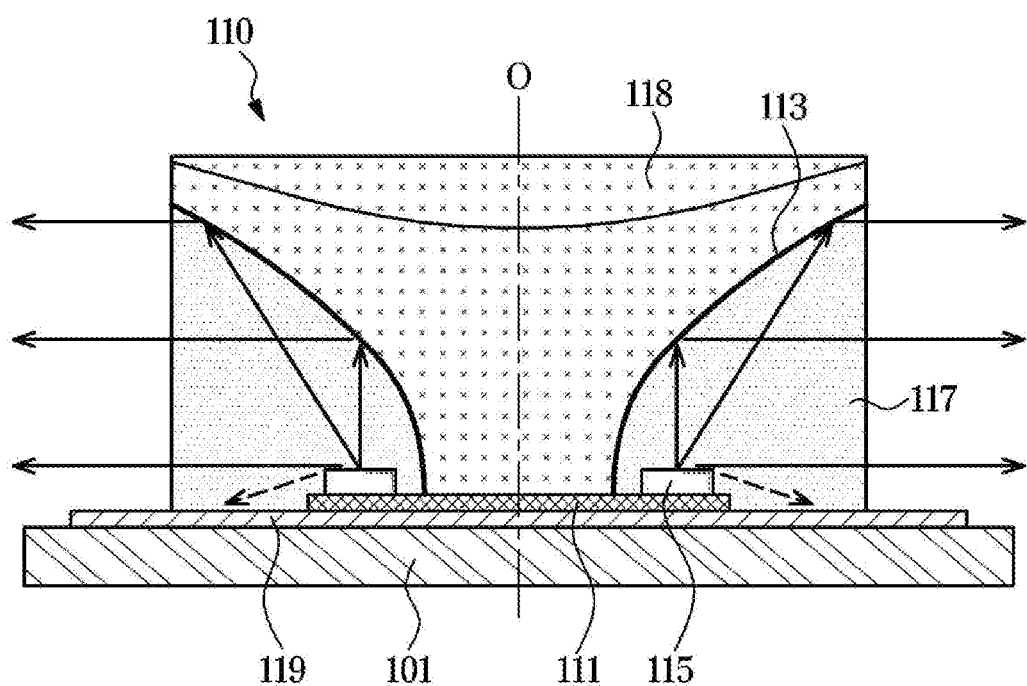
FIG. 4 schematically shows a cross section taken along line A-A' of FIG. 3.
Figure 5:
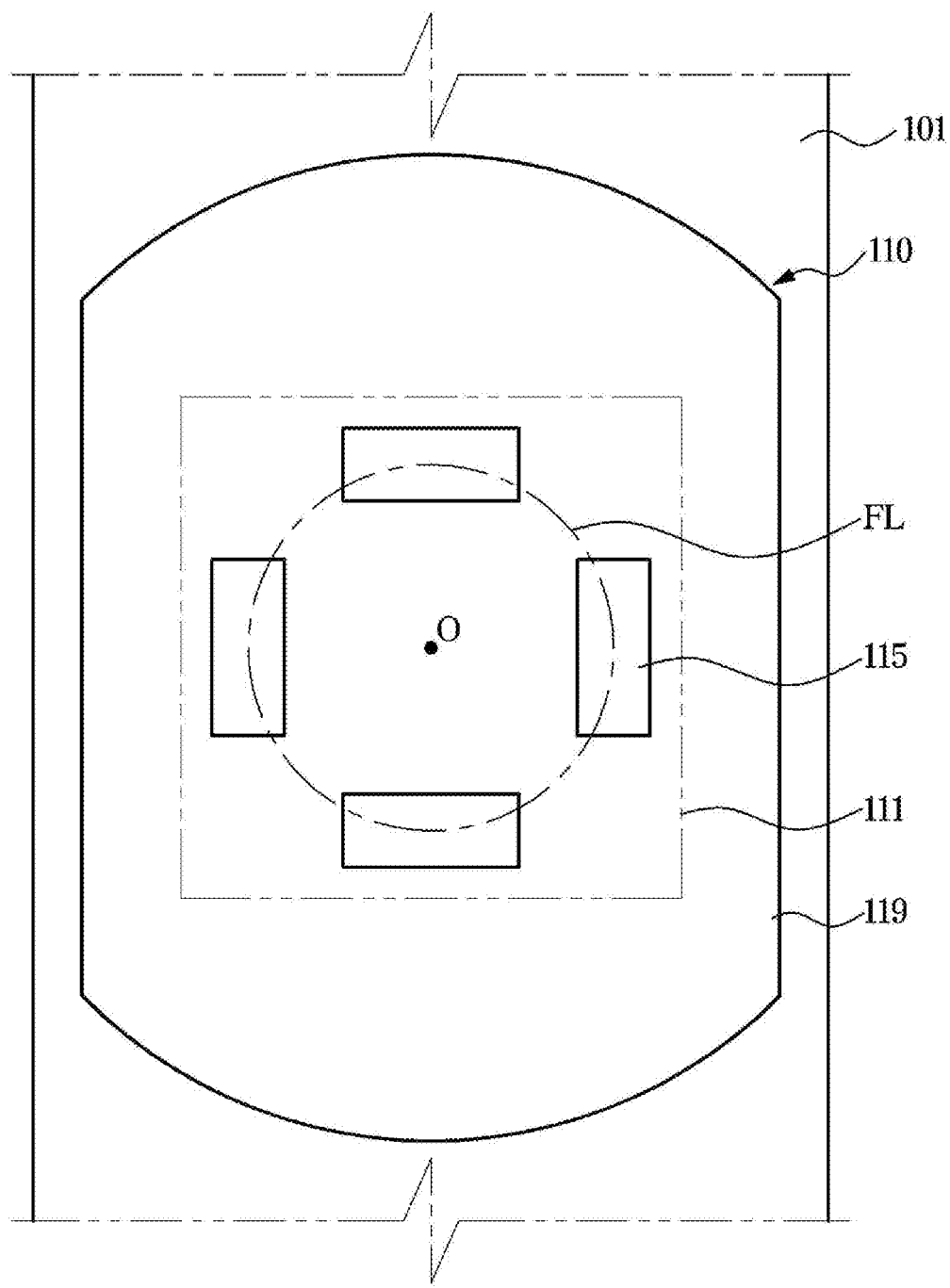
FIG. 5 is a front view showing the light source module shown in FIG. 3 and the portion of the PCB on which the light source module is mounted.

FIG. 3 is an enlarged schematic view showing the light source module shown in FIG. 2 and a portion of a PCB on which the light source module is mounted. FIG. 4 schematically shows a cross section taken along line A-A' of FIG. 3. FIG. 5 is a front view showing the light source module shown in FIG. 3 and the portion of the PCB on which the light source module is mounted.

Referring to FIG. 3, the light source device 100 may include the light source module 110 for providing light to the liquid crystal panel 10, and the PCB 101 on which the light source module 110 is mounted. A plurality of the light source module 110 may be provided to be mounted in a line on the PCB 101. Hereinafter, for convenience of description, a light source module 110 of the plurality of the light source module 110 will be described, and the other of the plurality of the light source module 110 may also have the same configuration as the light source module 110. The light source module 110 may include a substrate 111, a reflector 113, a plurality of light sources 115, a transmitting member 117, and a reflection member 118.

On the substrate 111, the plurality of light sources 115 may be mounted. The substrate 111 may be one of a silicon wafer, a polyimide substrate made of a transparent material, or a thin type PCB substrate. The substrate 111 may be electrically connected to the PCB 101.

Referring to FIG. 4, the reflector 113 may be positioned on the substrate 111. The reflector 113 may be positioned in front of the substrate 111. The reflector 113 may include a curved surface that has a shape resulting from rotating a portion of a parabola, having a directrix O that is perpendicular to the substrate 111 with respect to the directrix O. A cross section of the reflector 113, which is perpendicular to the substrate 111, may correspond to a parabola of which an axis is the substrate 111.

The reflector 113 may reflect light irradiated from the plurality of light sources 115. The reflector 113 may include a lens or mirror. A surface of the reflector 113 toward the plurality of light sources 115 may be coated with a reflection film to reflect light irradiated from the plurality of light sources 115. The reflection film may include silver or aluminum.

Referring to FIG. 5, the plurality of light sources 115 may be positioned at focal points of parabolas of the reflector 113. The plurality of light sources 115 may be mounted on the substrate 111 along a focal line FL connecting the focal points of the parabolas of the reflector 113. When the plurality of light sources 115 are mounted on the substrate 111, the plurality of light sources 115 may be electrically connected to each other. The plurality of light sources 115 may be rotationally symmetrical to each other with respect of the directrix O of the parabolas of the reflector 113. The plurality of light sources 115 may be four pieces each having a rectangular shape. The plurality of light sources 115 may be arranged to upper, lower, left, and right sides of the directrix O.

Because the reflector 113 is formed in a shape of a curved surface of which a cross section is a parabola and the plurality of light sources 115 are positioned at the focal points of the parabolas of the reflector 113, collimating of light irradiated from the plurality of light sources 115 may be improved when the light is reflected in a side direction of the reflector 113. Because collimating of the light source module 110 is improved, the display apparatus 1 may secure diffusion of light. Accordingly, an optical distance which is a distance from one of the light sources 115 to the liquid crystal panel 10 may be reduced, thereby reducing a thickness of the display apparatus 1.

More specifically, according to a conventional technique, when an optical lens provided as an aspherical lens is applied to a single light source, a light orientation angle profile may be about 130°. However, in the light source module 110 according to an embodiment of the disclosure, a light orientation angle profile may become about 150° to 180°. As such, because the display apparatus 1 according to an embodiment of the disclosure secures diffusion of light and transmits light to a more distant location through the plurality of the light source module 110, the display apparatus 1 may have a slimmer thickness than the typical technique.

The plurality of light sources 115 may include blue light emitting diodes (LEDs) emitting blue light. The plurality of light sources 115 may be micro LEDs. However, the plurality of light sources 115 may be LEDs, Cold Cathode Fluorescent Lamps (CCFLs), or External Electrode Fluorescent Lamps (EEFLs).

The transmitting member 117 may be positioned between the plurality of light sources 115 and the reflector 113. The transmitting member 117 may be positioned behind the reflector 113. The transmitting member 117 may include a transparent material such that light irradiated from the plurality of light sources 115 arrives at the reflector 113. The transmitting member 117 may include silicon Si.

The reflection member 118 may be positioned on one surface of the reflector 113, which is opposite to the other surface of the reflector 113 on which the transmitting member 117 is positioned. The reflection member 118 may be positioned in front of the reflector 113. The reflection member 118 may fill a space formed by the reflector 113 and the substrate 111. The reflection member 118 may cover a front surface of the reflector 113. The reflection member 118 may have a greater refractive index than the transmitting member 117. The reflection member 118 may enable the reflector 113 to reflect light being incident from outside of the light source module 110. The reflection member 118 may include titanium dioxide $TiO_2$.

The light source module 110 may further include a reflection pad 119 electrically separated into a positive pole and a negative pole. The reflection pad 119 may be positioned behind the substrate 111. The reflection pad 119 may be positioned in front of the PCB 101. The reflection pad 119 may include a mirror.

The reflection pad 119 may reflect light irradiated backward from the plurality of light sources 115 among light irradiated from the plurality of light sources 115. The reflection pad 119 may reflect light reflected by the reflector 113 and traveling backward. The reflection pad 119 may improve optical efficiency of the display apparatus 1.

Figure 6:
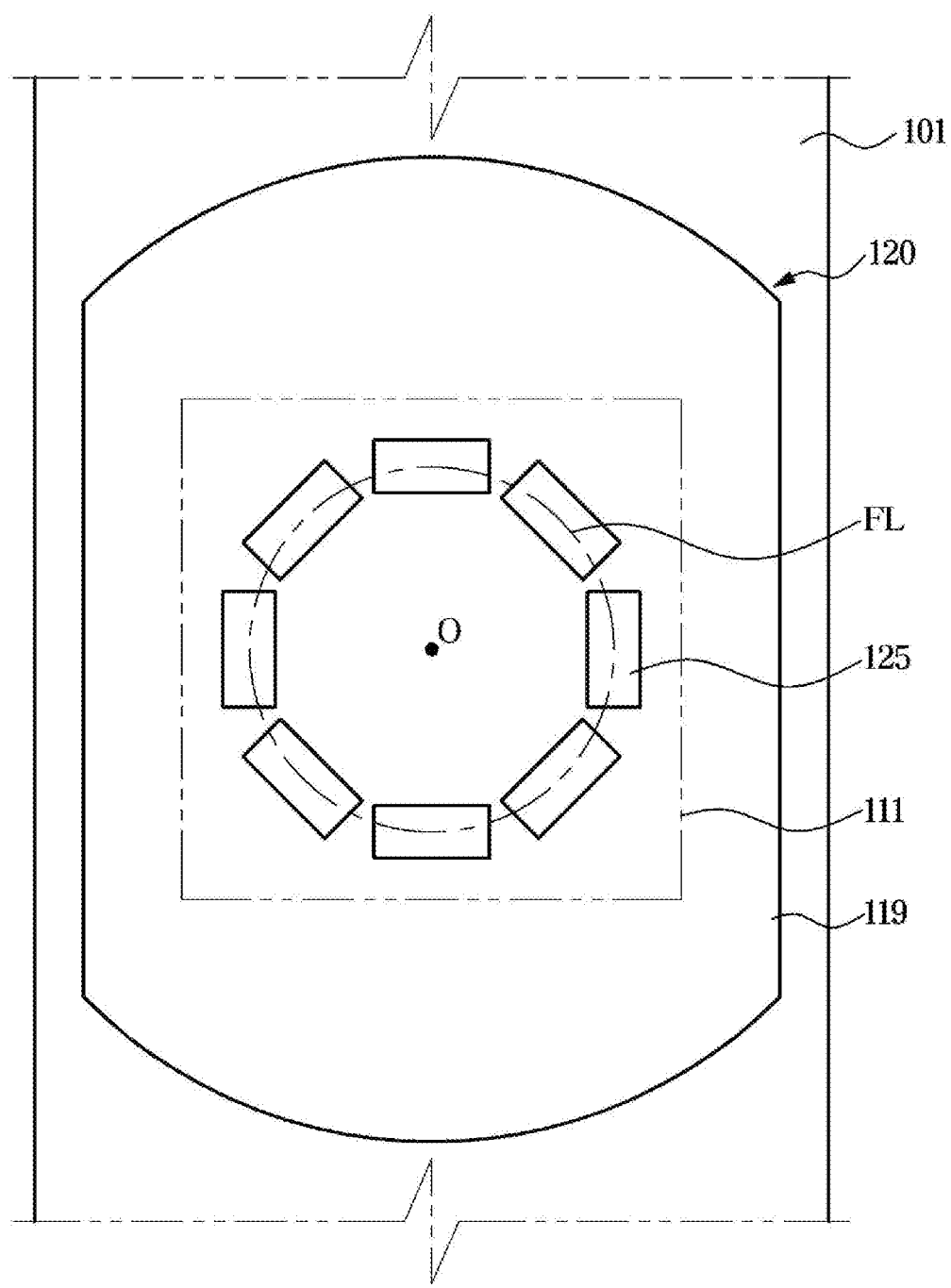
FIG. 6 is a front view showing a light source module and a portion of a PCB on which the light source module is mounted, according to another embodiment of the disclosure.

FIG. 6 is a front view showing a light source module and a portion of a PCB on which the light source module is mounted, according to another embodiment of the disclosure.

Referring to FIG. 6, a light source module 120 according to another embodiment of the disclosure will be described. However, the same components as those described above with reference to FIGS. 3 to 5 will be assigned the same reference numbers, and descriptions thereof will be omitted.

Referring to FIG. 6, the light source module 120 according to another embodiment of the disclosure may include a plurality of light sources 125 mounted along a focal line FL of the parabolas of the reflector 113. The plurality of light sources 125 may be 8 pieces. The plurality of light sources 125 may be arranged in a nearly octagonal shape. Each light source 125 may be formed in a nearly rectangular shape.

Figure 7:
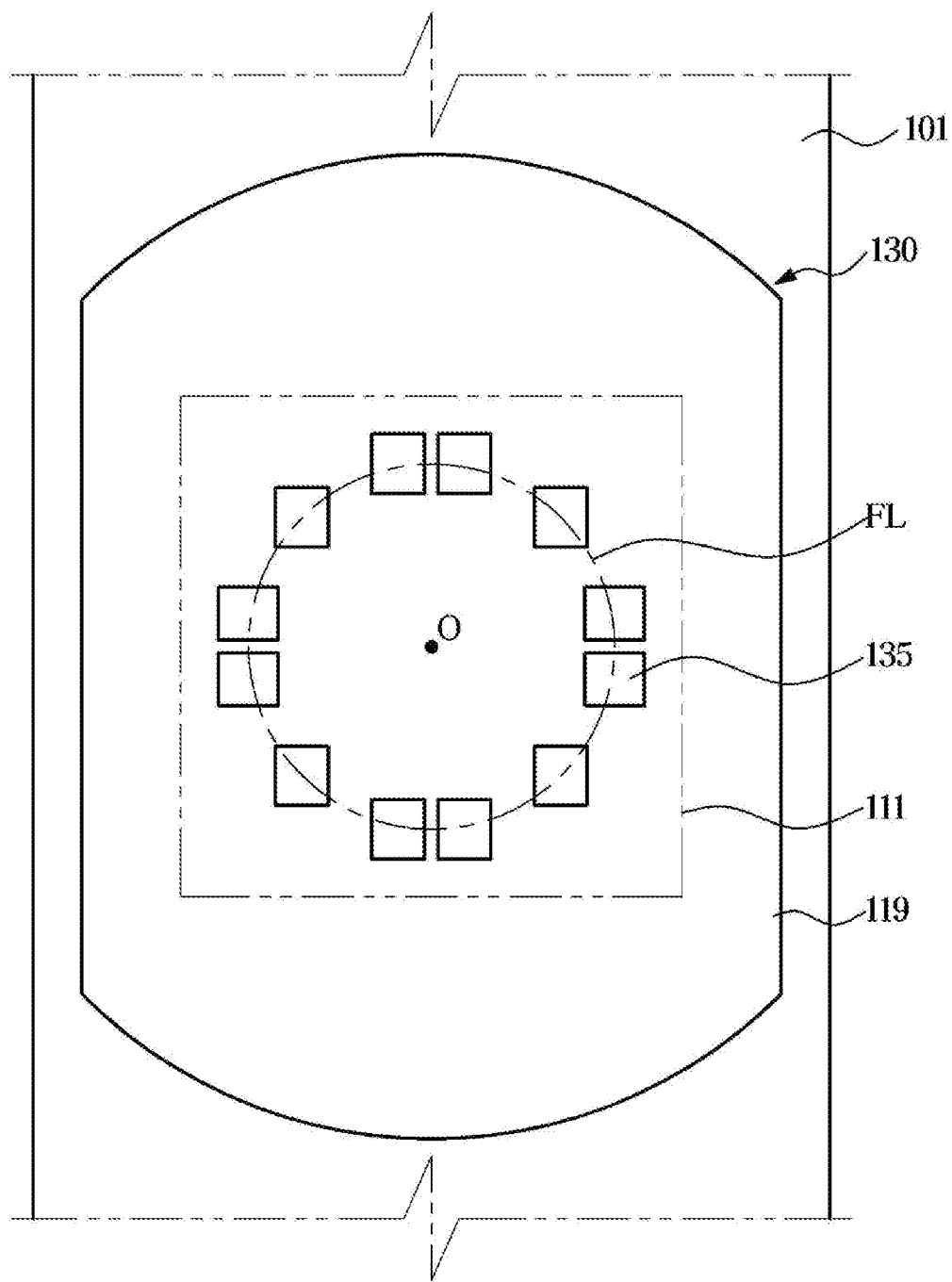
FIG. 7 is a front view showing a light source module and a portion of a PCB on which the light source module is mounted, according to another embodiment of the disclosure.

FIG. 7 is a front view showing a light source module and a portion of a PCB on which the light source module is mounted, according to another embodiment of the disclosure.

Referring to FIG. 7, a light source module 130 according to another embodiment of the disclosure will be described. However, the same components as those described above with reference to FIGS. 3 to 5 will be assigned the same reference numbers, and descriptions thereof will be omitted.

Referring to FIG. 7, a light source module 130 according to another embodiment of the disclosure may include a plurality of light sources 135 mounted along the focal line FL of the parabolas of the reflector 113. The plurality of light sources 135 may be 12 pieces. The plurality of light sources 135 may be arranged in a nearly circular shape.

Figure 8:
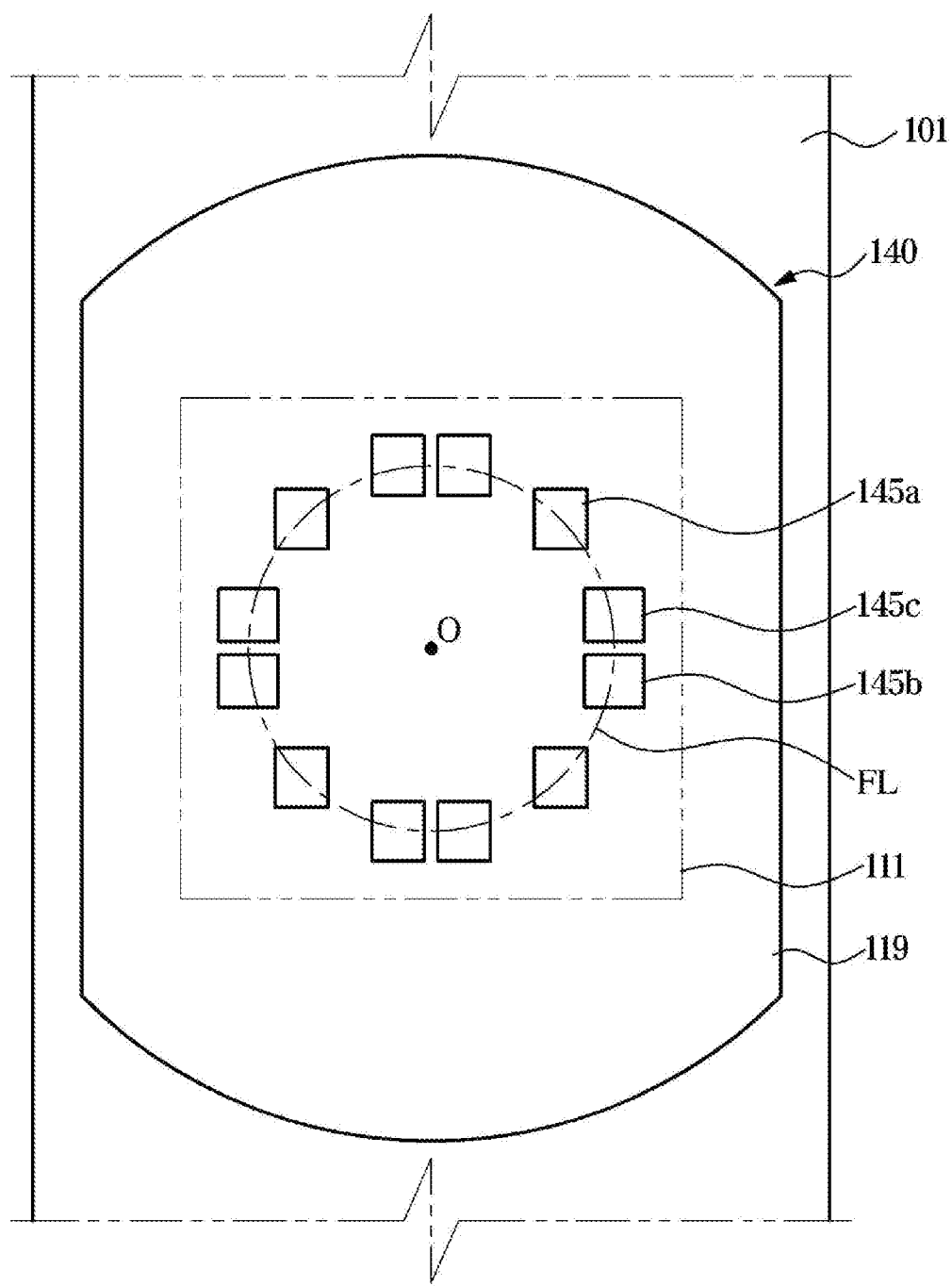
FIG. 8 is a front view showing a light source module and a portion of a PCB on which the light source module is mounted, according to another embodiment of the disclosure.

FIG. 8 is a front view showing a light source module and a portion of a PCB on which the light source module is mounted, according to another embodiment of the disclosure.

Referring to FIG. 8, a light source module 140 according to another embodiment of the disclosure will be described. However, the same components as those described above with reference to FIGS. 3 to 5 will be assigned the same reference numerals, and descriptions thereof will be omitted.

Referring to FIG. 8, the light source module 140 according to another embodiment of the disclosure may include a plurality of light sources 145a, 145b, and 145c mounted along the focal line FL of the parabolas of the reflector 113. The plurality of light sources 145a, 145b, and 145c may be 12 pieces. The plurality of light sources 145a, 145b, and 145c may be arranged in a nearly circular shape.

The plurality of light sources 145a, 145b, and 145c may have different wavelengths.

More specifically, when a plurality of light sources are manufactured, the light sources may be designed to have the same wavelength. However, the light sources may fail to have the same wavelength while manufacturing processes are performed. When such light sources are mounted one by one on a PCB, the number of light sources that are within an available wavelength range to arrange the light sources such that there are no great differences in wavelength from the neighboring light sources may be limited. For example, in the case of blue LEDs, about 54% of conventionally manufactured light sources are available, and the remaining light sources are unavailable due to their different wavelength ranges.

However, in the light source module 140 according to another embodiment of the disclosure, the plurality of light sources 145a, 145b, and 145c may be manufactured as the light source module 140 and mounted on the PCB 101. Therefore, the plurality of light sources 145a, 145b, and 145c included in the light source module 140 may become an available state although the light sources 145a, 145b, and 145c have more or less different wavelengths. That is, unlike the typical technique in which individual light sources irradiate light, in the light source module 140 according to another embodiment of the disclosure, light irradiated from the plurality of light sources 145a, 145b, and 145c may be reflected by the reflector 113, collimated, and diffused so that an available wavelength range of light sources may increase. As a result, a larger portion of manufactured light sources may be used. For example, when blue LEDs are applied to the light source module 140 according to another embodiment of the disclosure, the blue LEDs may be available up to about 91%.

Figure 9:
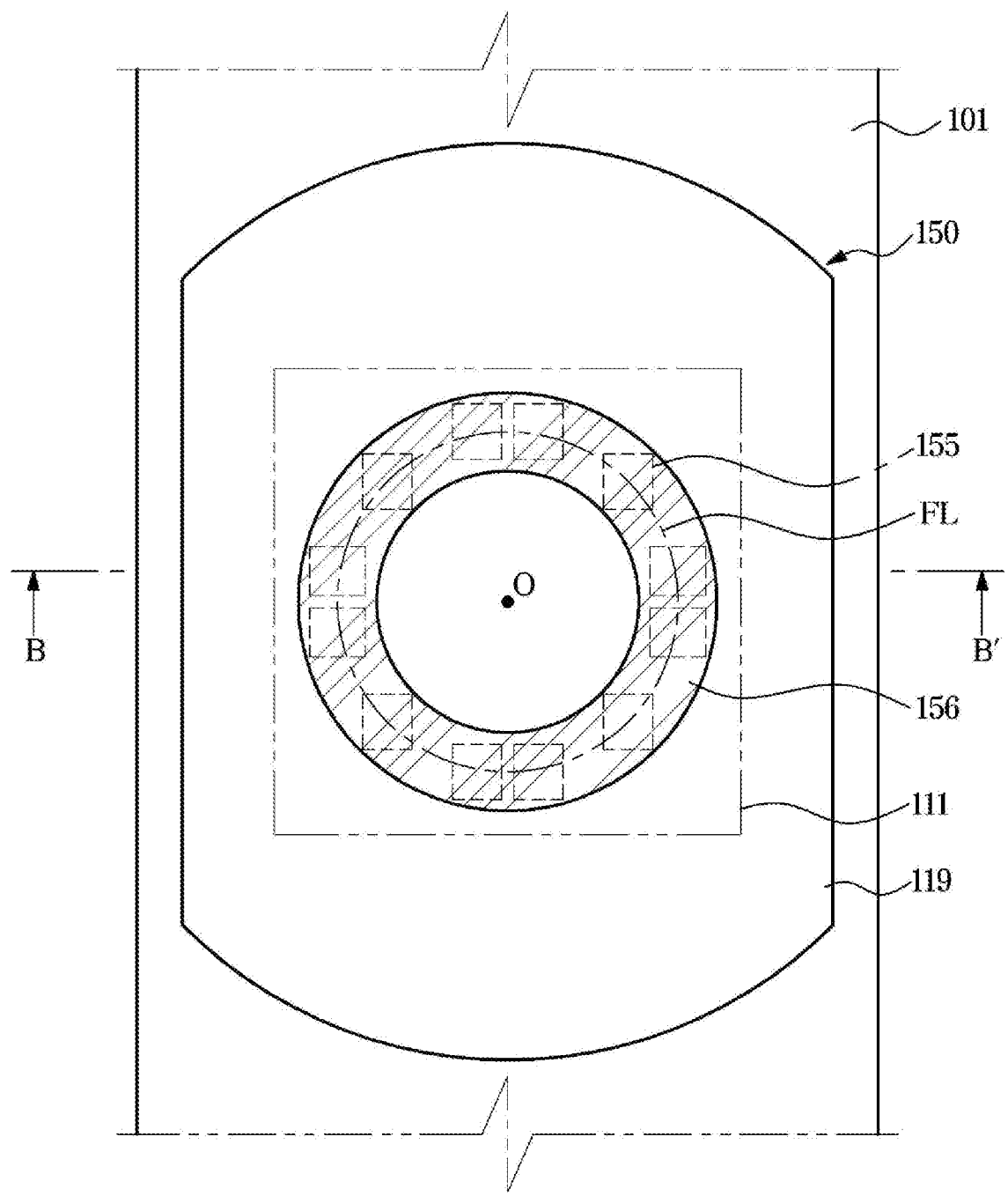
FIG. 9 is a front view showing a light source module and a portion of a PCB on which the light source module is mounted, according to another embodiment of the disclosure.
Figure 10:
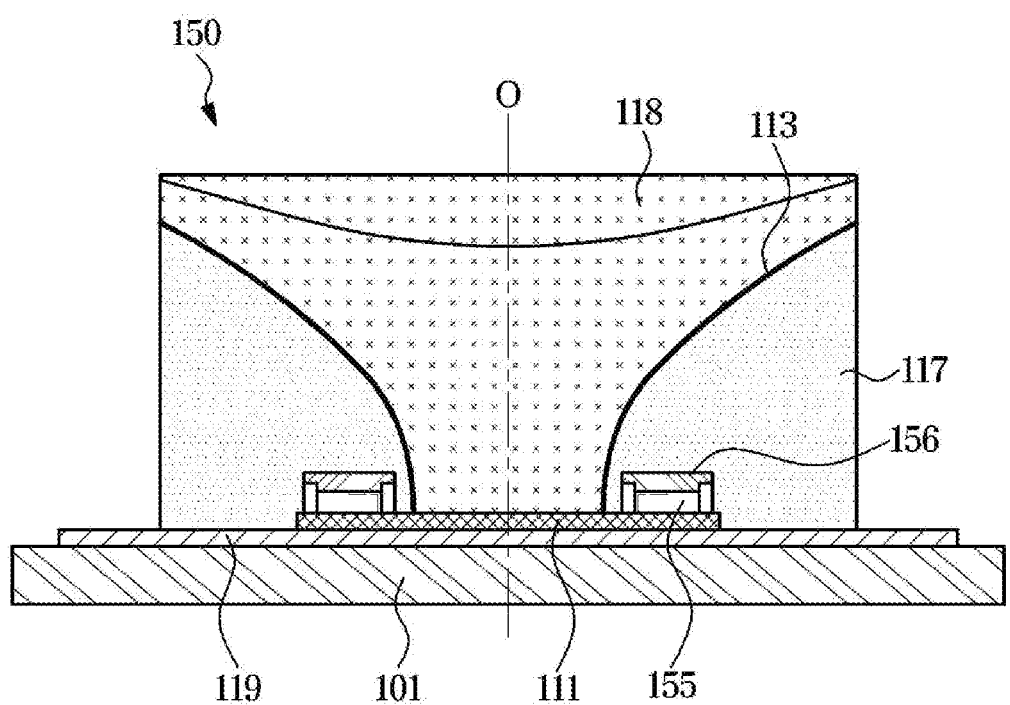
FIG. 10 schematically shows a cross section taken along line B-B' of FIG. 9.

FIG. 9 is a front view showing a light source module and a portion of a PCB on which the light source module is mounted, according to another embodiment of the disclosure. FIG. 10 schematically shows a cross section taken along line B-B' of FIG. 9.

Referring to FIGS. 9 and 10, a light source module 150 according to another embodiment of the disclosure will be described. However, the same components as those described above with reference to FIGS. 3 to 5 will be assigned the same reference numerals, and descriptions thereof will be omitted.

Referring to FIG. 9, the light source module 150 according to another embodiment of the disclosure may include a plurality of light sources 155 arranged in the same pattern as the plurality of light sources 135 shown in FIG. 7. The plurality of light sources 155 may be blue LEDs. The light source module 150 may include a color conversion device 156 positioned on the plurality of light sources 155.

The color conversion device 156 may convert blue light irradiated from the plurality of light sources 155 into white light. The color conversion device 156 may include phosphors. The color conversion device 156 may be in a shape of a ring extending along an arrangement direction of the plurality of light sources 155.

Figure 11:
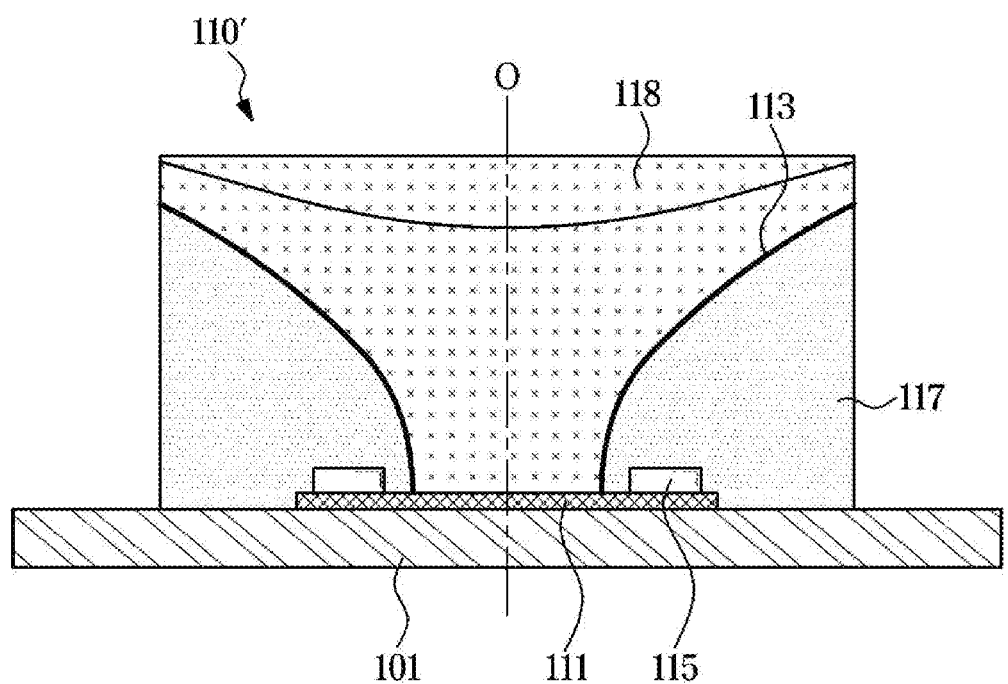
FIG. 11 shows a cross section of a light source module and a portion of a PCB on which the light source module is mounted, according to another embodiment of the disclosure.

FIG. 11 shows a cross section of a light source module and a portion of a PCB on which the light source module is mounted, according to another embodiment of the disclosure.

Referring to FIG. 11, a light source module 110' according to another embodiment of the disclosure will be described. However, the same components as those described above with reference to FIGS. 3 to 5 will be assigned, and descriptions thereof will be omitted.

Referring to FIG. 11, the light source module 110' according to another embodiment of the disclosure may include no reflection pad 119, unlike the light source module 110 shown in FIGS. 3 to 5. The light source module 110' may reduce manufacturing cost and increase productivity because the reflection pad 119 is omitted.

According to a concept of the disclosure, because the display apparatus includes a light source module including a reflector having a shape of a curved surface of a rotationally symmetrical structure and a plurality of light sources arranged to be rotationally symmetrical to each other along focal points of the reflector, a light orientation angle may be improved.

According to a concept of the disclosure, because the display apparatus includes the light source module with the improved light orientation angle, an optical distance from the light sources to a liquid crystal panel may be reduced, thereby reducing a thickness of the display apparatus.

According to a concept of the disclosure, because the light source module including the plurality of light sources is mounted on a PCB, the productivity of the display apparatus may be improved.

According to a concept of the disclosure, because the light orientation angle is improved, the optical efficiency of the display apparatus may be improved.

Although a few embodiments of the disclosure have been shown and described, it would be appreciated by those skilled in the art that changes may be made in these embodiments without departing from the principles and spirit of the disclosure.

What is claimed is:

1. A display apparatus comprising:
a liquid crystal panel;
a light source module configured to provide light to the liquid crystal panel;
a printed circuit board (PCB) on which the light source module is mounted; and
at least one chassis accommodating the liquid crystal panel and the PCB,
wherein the light source module comprises:
a substrate;
a reflector positioned on the substrate, and comprising a curved surface having a shape resulting from rotating a portion of a parabola around a directrix of the parabola, the directrix perpendicular to the substrate;
a plurality of light sources mounted on the substrate along focal points of the parabola of the reflector; and
a transmitting member that comprises a transparent material, the transmitting member positioned between the plurality of light sources and the reflector,
wherein the light source module further comprises a reflection member positioned on a surface of the reflector, which is opposite to the curved surface of the reflector on which the transmitting member is positioned, the reflection member comprising a body having a greater refractive index than the transmitting member, and
wherein the reflector, the plurality of light sources, the transmitting member, and the reflection member are in direct contact with a front surface of the substrate.

2. The display apparatus of claim 1, wherein the plurality of light sources are arranged rotationally symmetrical with respect to the directrix of the parabola of the reflector.

3. The display apparatus of claim 1, wherein the transparent material of the transmitting member comprises silicon.

4. The display apparatus of claim 1, wherein the body of the reflection member comprises titanium dioxide $TiO_2$.

5. The display apparatus of claim 1, wherein
the plurality of light sources are configured to irradiate the light, and the reflector comprises at least one from among silver and aluminum, the reflector configured to reflect the light irradiated from the plurality of light sources.

6. The display apparatus of claim 1, wherein
the plurality of light sources comprises blue light emitting diodes (LEDs), and
the light source module further comprises a color conversion device comprising a phosphor, the color conversion device configured to convert blue light irradiated from the plurality of light sources into white light.

7. The display apparatus of claim 6, wherein the color conversion device is in a shape of a ring extending along an arrangement direction of the plurality of light sources.

8. The display apparatus of claim 1, wherein the plurality of light sources comprises blue light emitting diodes (LEDs), and a wavelength of one of the plurality of light sources is different from a wavelength of another of the plurality of light sources.

9. The display apparatus of claim 1, wherein the plurality of light sources are electrically connected to each other.

10. The display apparatus of claim 1, wherein the light source module further comprises a reflection pad positioned behind the substrate.

11. The display apparatus of claim 1, wherein the plurality of light sources are arranged in a shape of a polygon.

12. The display apparatus of claim 1, wherein the plurality of light sources are arranged in a shape of a circle.

13. A display apparatus comprising:
a light source module configured to provide light;
a printed circuit board (PCB) on which the light source module is mounted; and
at least one chassis accommodating the PCB,
wherein the light source module comprises:
a substrate;
a reflector positioned on the substrate, and comprising a curved surface having a shape resulting from rotating a portion of a parabola around a directrix of the parabola, the directrix perpendicular to the substrate;
a plurality of light sources arranged rotationally symmetrical to each other with respect to the directrix of the parabola of the reflector;
a transmitting member comprising a transparent material, the transmitting member positioned between the reflector and the plurality of light sources; and
a reflection member positioned on a surface of the reflector, which is opposite to the curved surface of the reflector on which the transmitting member is positioned, the reflection member comprising a body having a greater refractive index than the transmitting member, and wherein the reflector, the plurality of light sources, the transmitting member, and the reflection member are in direct contact with a front surface of the substrate.

14. The display apparatus of claim 13, wherein the plurality of light sources are mounted on the substrate along focal points of the parabola of the reflector.

15. The display apparatus of claim 13, wherein
the plurality of light sources are configured to irradiate the light, and
the reflector comprises at least one from among silver and aluminum, the reflector configured to reflect the light irradiated from the plurality of light sources.

16. The display apparatus of claim 13, wherein
the plurality of light sources comprises blue light emitting diodes (LEDs), and
the light source module further comprises a color conversion device comprising a phosphor, the color conversion device configured to convert blue light irradiated from the plurality of light sources into white light.

17. A light source module for providing light in a display, the light source module comprising:
a substrate;
a reflector positioned on the substrate, and comprising a curved surface having a shape resulting from rotating a portion of a parabola around a directrix of the parabola, the directrix perpendicular to the substrate;
a plurality of light sources mounted on the substrate along focal points of the parabola of the reflector;
a transmitting member comprising a transparent material, the transmitting member positioned between the reflector and the plurality of light sources; and
a reflection member positioned on a surface of the reflector, which is opposite to the curved surface of the reflector on which the transmitting member is positioned, the reflection member comprising a body having a greater refractive index than the transmitting member,
wherein the reflector, the plurality of light sources, the transmitting member, and the reflection member are in direct contact with a front surface of the substrate.

18. The display apparatus of claim 1, wherein
the plurality of light sources are configured to emit the light in a direction perpendicular to the front surface of the substrate.

19. The display apparatus of claim 13, wherein
the plurality of light sources are configured to emit the light in a direction perpendicular to the front surface of the substrate.

20. The light source module of claim 17, wherein
the plurality of light sources are configured to emit the light in a direction perpendicular to the front surface of the substrate.

* * * * *